March 6, 1928.  L. ALTPETER  1,661,782

CENTRIFUGE

Filed Jan. 26, 1927

INVENTOR:
Ludwig Altpeter
BY: Ruep, Boyn + Bakelei
ATTORNEYS

Patented Mar. 6, 1928.

1,661,782

UNITED STATES PATENT OFFICE.

LUDWIG ALTPETER, OF TRIER, GERMANY.

CENTRIFUGE.

Application filed January 26, 1927, Serial No. 163,602, and in Germany July 8, 1925.

This invention concerns improvements in or relating to centrifuges. In continuously operating centrifuges which consist of a shell comprising two cup- or cone-shaped parts resting on one another by means of annular packing surfaces and wherein the removal of the material centrifuged is effected by lifting one of the said parts, the packing of the two cups against one another is constituted of wood, rubber or other yielding packing agent. These, however, have the disadvantage that in the course of time they become hard and wear considerably.

The present invention avoids this drawback by utilizing the substance which is centrifuged itself to assist in the packing.

In a preferred embodiment of the present invention packing surfaces are formed on a projection on one of the parts of the centrifuge and corresponding packing surfaces are formed on the other part in embracing contact with the first mentioned projection in the mouth of the space provided for collecting centrifuged material.

One embodiment of the invention is illustrated by way of example in the accompanying drawings in which:—

Figure 1:
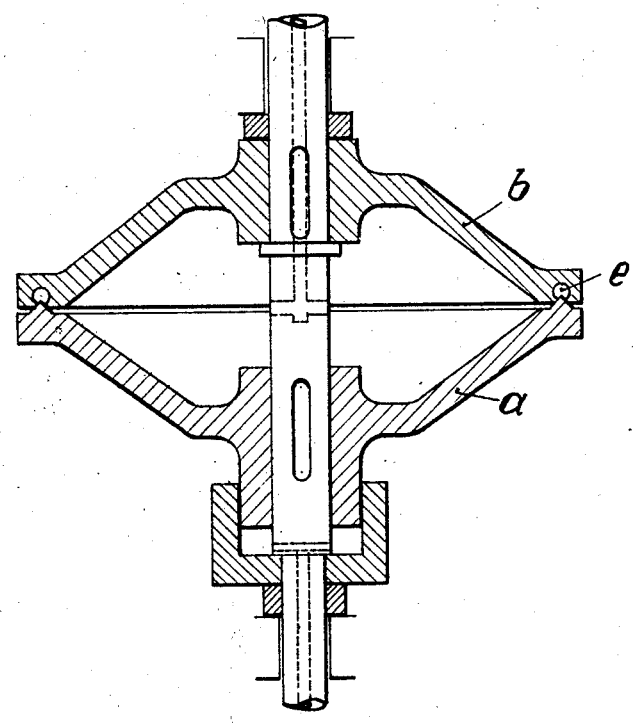
Figure 2:
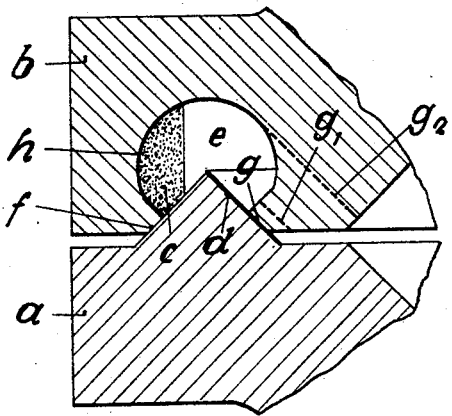

Fig. 1 is a vertical section through a centrifuge constructed according to the invention and Fig. 2 is a detail view to a larger scale of the packing means illustrated in Fig. 1.

Referring to the drawings the two cup members of the centrifuge are indicated by the reference letters $a$, $b$. The rim of the cup $a$ is provided with an annular projection having a wedge shaped cross-section and packing surfaces $c$, $d$, while a recess disposed in the rim of the cup $b$ has two projecting annular packing surfaces $f$ and $g$ which are adapted to bear against the packing surfaces $c$ and $d$ of the cup $a$.

Behind the projecting annular packing surfaces $f$ and $g$ of the cup $b$ there is situated an annular collecting space $e$ which may be of such shape that its outer wall $h$ projects beyond the outer packing surface $f$, that is, is at a greater radial distance from the axis of the centrifuge than the latter. This is, however, not essential. Any material, which during centrifuging, penetrates between the packing surfaces $d$, $g$, passes to the collecting space $e$.

The solid components of the material centrifuged deposit at the outer wall of the annular recess and collect in front of the packing surfaces $c$ and $f$ to effect a secure packing closure or seal there.

The purpose of shaping the annular recess in the cup $b$ in such a manner that the outer wall $h$ of the collecting space $e$ projects beyond the outer packing surface $f$ is that, on separating the cups and emptying the centrifuge, a part of the material collected in the collecting space $e$ to serve as packing remains therein so as to be immediately available, further material flowing thereto, for packing purposes when the cups are brought together again.

Furthermore experiments have shown that the space $e$ need only be closed by the outer packing surfaces $c$, $f$, while it may be open at the inside. The annular surface on the cup $b$ might therefore be disposed along the line $g^1$ or $g^2$, that is, the annular collecting space $e$, may be completely open on the inside without the result achieved by the present invention being materially affected.

I claim:

1. A centrifugal machine comprising a shell formed of two parts resting one upon the other, each of said parts having an annular flange extending radially therefrom at its circumference, said flanges being formed to provide between them an annular channel in communication with the interior of the shell and adapted to receive a portion of the material displaced by the centrifugal action of the shell thereby to assist in caulking the joint between the two parts of the shell.

2. A centrifugal machine comprising a shell formed of two parts resting one upon the other, each of said parts having an annular flange extending radially therefrom at its circumference, said flanges being provided with mating portions adapted to form a packing engagement at the outer side of said mating portions and an annular channel in communication with the interior of the shell and adapted to receive a portion of the material displaced by the centrifugal action of the shell thereby to assist in caulking the joint between the two parts of the shell.

3. A centrifugal machine comprising a shell formed of two parts resting one upon the other, each of said parts having an annular flange extending radially therefrom at its circumference, one of said flanges being provided with an annular projection and the other with a depression adapted to form with said projection a packing surface at the outer side thereof and an annular channel in communication with the interior of the shell and adapted to receive a portion of the material displaced by the centrifugal action of the shell thereby to assist in caulking the joint between the two parts of the shell.

4. A centrifugal machine comprising a shell formed of two separable parts resting one upon the other, each of said parts having an annular flange extending radially therefrom at its circumference, one of said flanges being provided with an annular projection and the other with a recess adapted to form with said projection a packing surface at the outer side thereof and an annular channel in said recessed flange in communication with the interior of the shell and with said recess, said channel being adapted to receive a portion of the material displaced by the centrifugal action of the shell thereby to assist in caulking the joint between the two parts of the shell, the configuration of said packing portions and channel being such as to retain the material collected in said channel when the parts are separated.

In testimony whereof I affix my signature.

LUDWIG ALTPETER.